(12) United States Patent
Lee et al.

(10) Patent No.: US 12,368,197 B2
(45) Date of Patent: Jul. 22, 2025

(54) PELLET-TYPE ANODE-FED METAL-CARBON DIOXIDE BATTERY AND A HYDROGEN GENERATION AND CARBON DIOXIDE STORAGE SYSTEM INCLUDING SAME

(71) Applicants: HYUNDAI MOTOR COMPANY, Seoul (KR); KIA CORPORATION, Seoul (KR); INDUSTRY-ACADEMIC COOPERATION FOUNDATION, YONSEI UNIVERSITY, Seoul (KR)

(72) Inventors: Yun Su Lee, Uiwang-si (KR); Ji Hoon Jang, Suwon-si (KR); Dong Il Lee, Goyang-si (KR); Yong Sung Jo, Seoul (KR)

(73) Assignees: HYUNDAI MOTOR COMPANY, Seoul (KR); KIA CORPORATION, Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 448 days.

(21) Appl. No.: 18/077,073

(22) Filed: Dec. 7, 2022

(65) Prior Publication Data

US 2023/0369683 A1 Nov. 16, 2023

(30) Foreign Application Priority Data

May 13, 2022 (KR) .......................... 10-2022-0058717

(51) Int. Cl.
*H01M 12/02* (2006.01)
*C25B 1/04* (2021.01)
(Continued)

(52) U.S. Cl.
CPC ............... *H01M 12/08* (2013.01); *C25B 1/04* (2013.01); *H01M 4/38* (2013.01); *H01M 4/926* (2013.01);
(Continued)

(58) Field of Classification Search
CPC ........ H01M 12/08; H01M 4/38; H01M 4/926; H01M 8/0273; C25B 1/04
See application file for complete search history.

(56) References Cited

U.S. PATENT DOCUMENTS 8,603,702 B2  12/2013  Kim et al.
2011/0117456 A1*  5/2011  Kim ...................... H01M 50/44
                                                              429/406

FOREIGN PATENT DOCUMENTS

JP       2008146902 A    6/2008
KR       101176995 B1    8/2012
(Continued)

OTHER PUBLICATIONS

Metal/Carbon-Dioxide Battery and Hydrogen Production and Carbon Dioxide Storage System Comprising Same, U.S. Appl. No. 17/958,595, filed Oct. 3, 2022 in the United States Patent and Trademark Office, 27 pages.

*Primary Examiner* — Zulmariam Mendez
(74) *Attorney, Agent, or Firm* — Lempia Summerfield Katz LLC

(57) ABSTRACT

A metal-carbon dioxide battery and a hydrogen generation and carbon dioxide storage system including the battery are disclosed. The metal-carbon dioxide battery includes a first plate, a second plate, a separator interposed between the first plate and the second plate, a first gasket interposed between the first plate and the separator to define a gap between the first plate and the separator, an anode material accommo-
(Continued)

dated in the gap and having a shape of a pellet, and a cathode interposed between the second plate and the separator.

20 Claims, 12 Drawing Sheets

(51) Int. Cl.
*H01M 4/38* (2006.01)
*H01M 4/92* (2006.01)
*H01M 8/0273* (2016.01)
*H01M 12/08* (2006.01)
*H01M 4/02* (2006.01)
*H01M 4/86* (2006.01)

(52) U.S. Cl.
CPC .... *H01M 8/0273* (2013.01); *H01M 2004/027* (2013.01); *H01M 2004/8689* (2013.01)

(56) References Cited

FOREIGN PATENT DOCUMENTS

| | | | |
|---|---|---|---|
| KR | 101736505 | B1 | 5/2017 |
| KR | 101955696 | B1 | 3/2019 |

* cited by examiner

PELLET-TYPE ANODE-FED METAL-CARBON DIOXIDE BATTERY AND A HYDROGEN GENERATION AND CARBON DIOXIDE STORAGE SYSTEM INCLUDING SAME

CROSS REFERENCE TO RELATED APPLICATION

The present application claims priority to Korean Patent Application No. 10-2022-0058717, filed May 13, 2022, the entire contents of which are incorporated herein for all purposes by this reference.

BACKGROUND

1. Field of the Disclosure

The present disclosure relates to a pellet-type anode-fed metal-dioxide battery and a hydrogen generation and carbon dioxide storage system including the same.

2. Description of the Related Art

Recently, research on electrochemical water electrolysis has been carried out in line with the development of renewable energy for dealing with climate change. In addition, the importance of technologies for carbon dioxide ($CO_2$) capture, storage, and conversion to reduce greenhouse gases is growing.

Water-based cell systems based on zinc/aluminum (Zn/Al) are promising candidates for metal anodes in terms of price and reserves. A Zn/Al-based water-based cell system is a system that captures carbon dioxide in the form of salts such as potassium bicarbonate ($KHCO_3$) and produces hydrogen at the same time.

Korean Patent No. 10-1955696 discloses a secondary battery including: a first aqueous solution accommodated in a first accommodation space; a cathode that is at least partially immersed in the first aqueous solution; a second aqueous solution that is an alkaline solution and accommodated in a second accommodation space; an anode that is at least partially immersed in the second aqueous solution; and a connection part composed of a connection passage and a porous ion transfer member installed in the connection passage. The connection passage connects the first accommodation space and the second accommodation space so that communication can occur between the first accommodation space and the second accommodation space. The porous ion transfer member prevents the first aqueous solution and the second aqueous solution from flowing through but allows ions to pass through. At the time of discharging, carbon dioxide gas is introduced into the first aqueous solution so that a reaction occurs between water of the first aqueous solution and the introduced carbon dioxide gas to produce hydrogen ions and bicarbonate ions. The hydrogen ions and electrons on the cathode combine to generate hydrogen gas.

However, this secondary battery has a high cell resistance because the secondary battery is long in distance between an anode and a cathode. When the cell resistance is high, the driving efficiency of the battery is significantly reduced. When the secondary battery is discharged with a current of about 80 mA, the cell potential has a negative value. In other words, a non-spontaneous reaction occurs.

SUMMARY

Therefore, there is a need for development of low-resistance batteries that may spontaneously operate. An objective of the present disclosure is to provide a metal-carbon dioxide battery having a low cell resistance and an extremely high efficiency.

Another objective of the present disclosure is to provide a metal-carbon dioxide battery to which an anode material may be continuously fed without dismantling the battery.

Another objective of the present disclosure is to provide a metal-carbon dioxide battery, which spontaneously operates even when seawater is used as an anode-side electrolyte and a cathode-side electrode.

However, the objectives of the present disclosure are not limited to the ones described above. Objectives of the present disclosure should become more apparent from the following description and the claims.

According to one embodiment of the present disclosure, a metal-carbon dioxide battery includes a first plate provided with a first electrolyte inlet formed to extend through the first plate and positioned at a predetermined position and with a first electrolyte outlet formed to extend through the first plate and spaced apart from the first electrolyte inlet by a predetermined distance. The battery also includes a second plate provided with a second electrolyte inlet formed to extend through the second plate and positioned at a predetermined position and with a second electrolyte outlet formed to extend through the second plate and spaced apart from the second electrolyte inlet by a predetermined distance. The battery further includes a separator disposed between the first plate and the second plate and a first gasket positioned between the first plate and the separator and configured as a frame structure with a central pass-through opening. The first gasket supports an edge portion of the first plate to form a gap between the first plate and the separator. The battery also includes an anode material received in the gap and having a pellet shape and a cathode positioned between the second plate and the separator.

The first gasket may have an opening at a portion of an upper region thereof so that the anode material can be supplied. The metal-carbon dioxide battery may further include a detachable stopper installed to cover the opening.

The metal-carbon dioxide battery may further include a plate-shaped support obliquely extending in an up-and-down direction and having a plurality of through holes.

The anode material may be contained in a space between the support and the separator.

The support may be obliquely installed such that the space in which the anode material is to be accommodated becomes narrower toward a lower end.

The support may include a stainless steel mesh.

A diameter of the through holes may be smaller than a diameter of the anode material.

The diameter of the through hole may be in the range of from 0.5 mm to 2 mm.

The anode material may include at least one material selected from the group comprising indium (In), copper (Cu), magnesium (Mg), aluminum (Al), stainless steel (SUS), iron (Fe), and combinations thereof.

The anode material may have a diameter in a range of from 3 mm to 10 mm.

The metal-carbon dioxide battery may further include a frame-shaped spacer disposed between the first gasket and the separator. The spacer may have a constant thickness and may have a central through-hole opening so that the gap between the first plate and the separator is increased by the thickness of the spacer.

The first gasket may have an opening at an upper portion thereof so as to receive the anode material through the opening. The spacer may have a cut portion communicating with the opening at a portion of an upper region of the spacer. The metal-carbon dioxide battery may further include a detachable stopper that covers the opening and the cut portion.

The metal-carbon dioxide battery may further include a plate-shaped porous protective film positioned between the anode material and the separator.

The cathode may include at least one material selected from the group comprising carbon paper, carbon fiber, carbon felt, carbon cloth, metal foam, metal thin film, and combinations thereof.

The cathode may include a noble metal catalyst supported on a support.

The second plate may include a plate-like body part and a protrusion part protruding from a center portion of a surface of the body part, in which the protrusion part has an area that is equal to or smaller than an area of the cathode. The second electrolyte inlet may be formed to pass through the protrusion part and the body part. The second electrolyte outlet may be formed to pass through the protrusion part and the body part. The second plate may further include a flow channel formed to be recessed from a surface of the protrusion part, in which a first end of the flow channel communicates with the electrolyte inlet and a second end of the flow channel communicates with the electrolyte outlet.

The cathode may be in direct contact with the protrusion part.

The metal-carbon dioxide battery may further include a second gasket installed to surround an outer circumferential surface of the protrusion part.

According to one embodiment of the present disclosure, a hydrogen generation and carbon dioxide storage system includes a metal-carbon dioxide battery that uses carbon dioxide as a fuel and generates hydrogen. The system also includes a first electrolyte supply unit connected to a first electrolyte inlet of the metal-carbon dioxide battery to supply a first electrolyte to the metal-carbon dioxide battery. The system further includes a second electrolyte supply unit connected to a second electrolyte inlet of the metal-carbon dioxide battery to supply a second electrolyte and carbon dioxide to the metal-carbon dioxide battery. The system also includes a separation unit connected to a second electrolyte outlet of the metal-carbon dioxide battery to receive a product of the metal-carbon dioxide battery, to separate hydrogen gas from the product, and to recover carbon dioxide stored in a salt form.

The first electrolyte may include an alkaline aqueous solution or seawater and the second electrolyte may include an alkaline aqueous solution or seawater.

According to the present disclosure, it is possible to obtain a metal-carbon dioxide battery having significantly improved efficiency due to reduced electrical resistance.

According to the present disclosure, it is possible to obtain a metal-carbon dioxide battery to which an anode material can be continuously fed without requiring dismantling of the battery.

According to the present disclosure, it is possible to obtain a metal-carbon dioxide battery which can spontaneously operate even when seawater is used as an anode-side electrolyte and a cathode-side electrode.

However, the advantages of the present disclosure are not limited thereto. It should be understood that the advantages of the present disclosure include all effects that can be inferred from the description given below.

DESCRIPTION OF THE EMBODIMENTS

Figure 1:
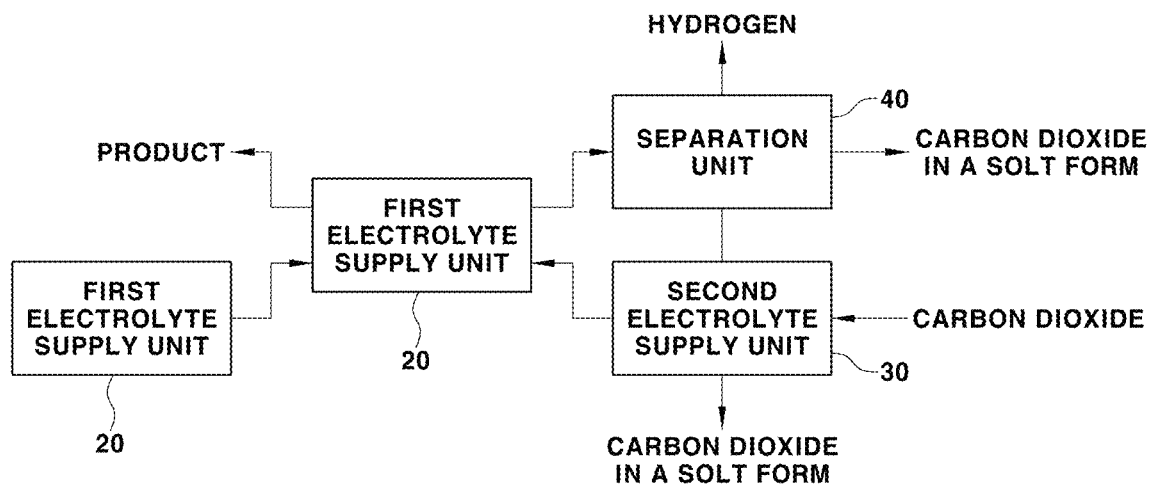
FIG. 1 is a diagram schematically illustrating the construction of a hydrogen production and carbon dioxide ($CO_2$) storage system according to one embodiment of the present disclosure.

Above objectives, other objectives, features, and advantages of the present disclosure should be readily understood from the following embodiments associated with the accompanying drawings. However, the present disclosure is not limited to the embodiments described herein and may be embodied in other forms. The embodiments described herein are provided so that the disclosure can be made thorough and complete and that the spirit of the present disclosure can be fully conveyed to those of ordinary skill in the art.

Throughout the drawings, like elements are denoted by like reference numerals. In the accompanying drawings, the dimensions of the structures are larger than actual sizes for clarity of the present disclosure. Terms used in the specification, such as "first", "second", and the like, may be used to describe various components, but the components are not to be construed as being limited to the terms. These terms are used only for the purpose of distinguishing a component from another component. For example, without departing from the scope of the present disclosure, a first component may be referred as a second component and a second component may be also referred to as a first component. As used herein, the singular forms "a", "an", and "the" are intended to include the plural forms as well unless the context clearly indicates otherwise.

It should be further understood that the terms "comprises", "includes", "has", or variations thereof when used in this specification specify the presence of stated features, regions, integers, steps, operations, elements and/or components, but do not preclude the presence or addition of one or more other features, regions, integers, steps, operations, elements, components and/or combinations thereof. It should also be understood that when an element such as a layer, film, area, or sheet is referred to as being "on" another element, the element can be directly on the other element, or intervening elements may be present therebetween. Similarly, when an element such as a layer, film, area, or sheet is referred to as being "under" another element, the element can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 is a diagram schematically illustrating the construction of a hydrogen production and carbon dioxide storage system according to one embodiment of the present disclosure. Referring to FIG. 1, the system includes a metal-carbon dioxide battery 10, a first electrolyte supply unit 20 connected to the metal-carbon dioxide battery 10 to supply a first electrolyte, a second electrolyte supply unit 30 connected to the metal-carbon dioxide battery 10 to supply a second electrolyte and carbon dioxide, and a separation unit 40 connected to the metal-carbon dioxide battery 10. The separation unit 40 is provided to receive a product of the metal-carbon dioxide battery 10, to separate hydrogen gas from the product, and to recover carbon dioxide stored in a salt form.

Korean Patent Application No. 10-2021-0136204, which is a preceding Korean patent application filed by the inventors, is of technical significance in terms of lowering the resistance of a battery cell by significantly reducing the distance between the cathode and the anode. However, since the technology of the prior application uses zinc foil, aluminum foil, or the like as an anode material, when the material is exhausted, the battery needs to be dismantled for replacement of the used anode with a new anode.

The present disclosure relates to a metal-carbon dioxide battery to which an anode material can be continuously fed without requiring dismantling of the battery.

Figure 2:
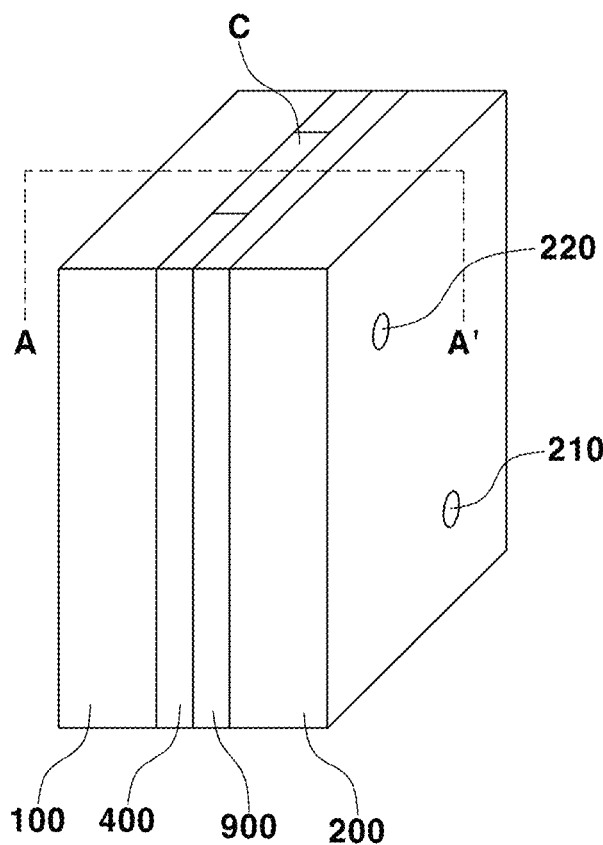
FIG. 2 is a perspective view of a metal-carbon dioxide battery according to a first embodiment of the present disclosure.
Figure 3:
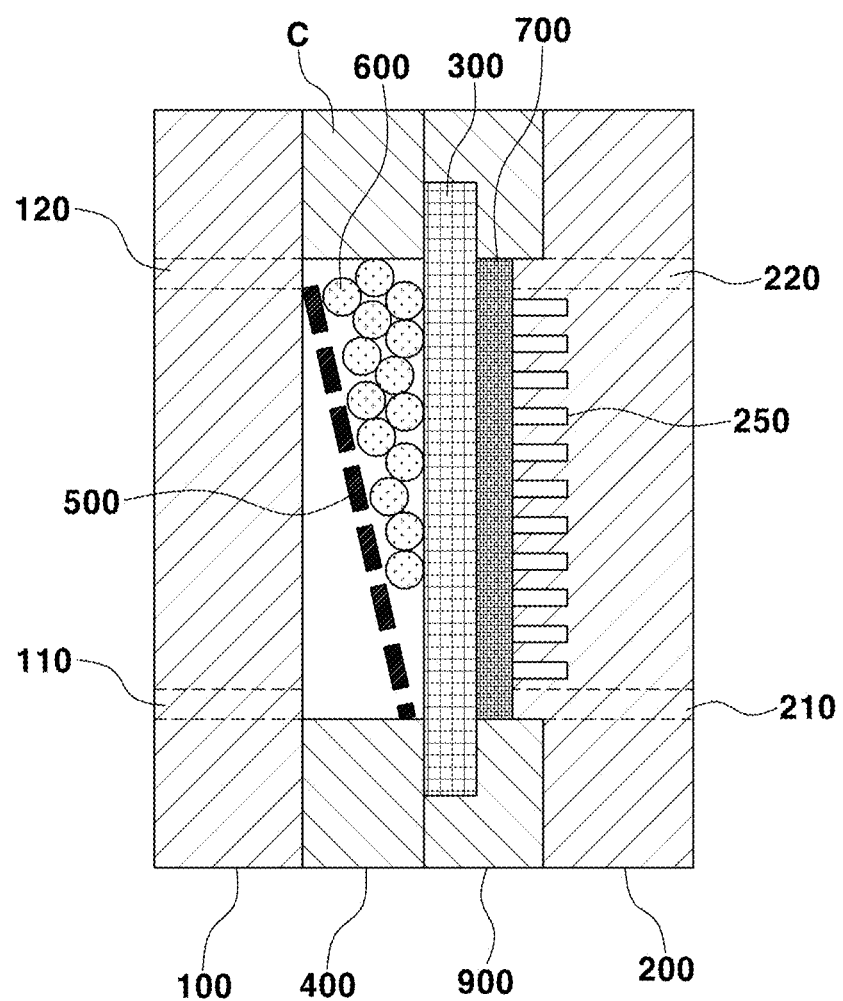
FIG. 3 is a cross-sectional view taken along line A-A' of FIG. 2.

FIG. 2 is a perspective view of a metal-carbon dioxide battery 10 according to a first embodiment of the present disclosure. FIG. 3 is a cross-sectional view taken along line A-A' of FIG. 2. Referring to FIG. 3, the metal-carbon dioxide battery includes a first plate 100, a second plate 200 spaced apart from the first plate 100 by a predetermined distance, and a separator 300 disposed between the first plate 100 and the second plate 200. The metal-carbon dioxide battery also includes a first gasket 400 disposed between the first plate 100 and the separator 300 to define a gap between the first plate 100 and the separator 300, a plate-shaped support 500 installed to extend in a vertically oblique direction and disposed in the gap, a pellet-type anode material 600 disposed in a gap between the support 500 and the separator 300, and a cathode 700 disposed between the second plate 200 and the separator 300. The metal-carbon dioxide battery also includes a second gasket 900 provided on the side surfaces of the separator 30 and the cathode 700 so that the side surfaces of the cathode 700 and the separator 30 are not exposed to the outside.

Figure 4:
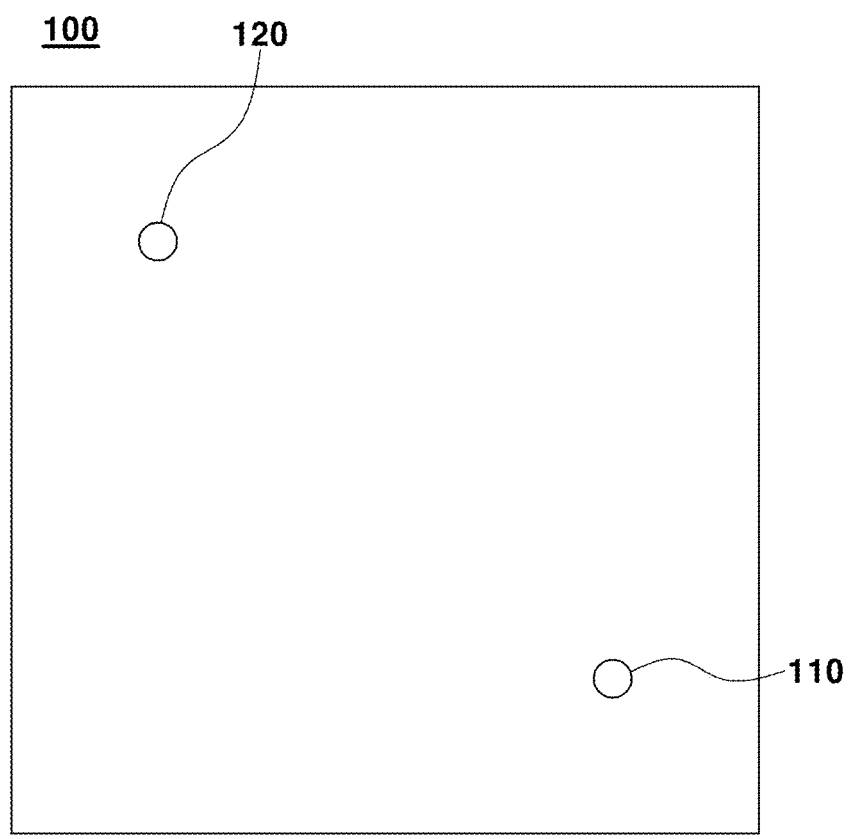
FIG. 4 is a plan view illustrating one surface of a first plate.

FIG. 4 is a plan view illustrating one surface of the first plate 100. The first plate 100 may serve as a current collector and thus may be made of a conductive material. Electrons generated by an oxidation reaction of the anode material 600 pass through the support 500 to the first plate 100 and collect on the first plate 100.

The first plate 100 has a first electrolyte inlet 110 provided at a predetermined position and a first electrolyte outlet 120 positioned at a predetermined distance from the first electrolyte inlet 110. The position of the first electrolyte inlet 110 and the position of the first electrolyte outlet 120 may not be particularly limited. The positions may be symmetrical with respect to the center point of the first plate 100.

Figure 5:
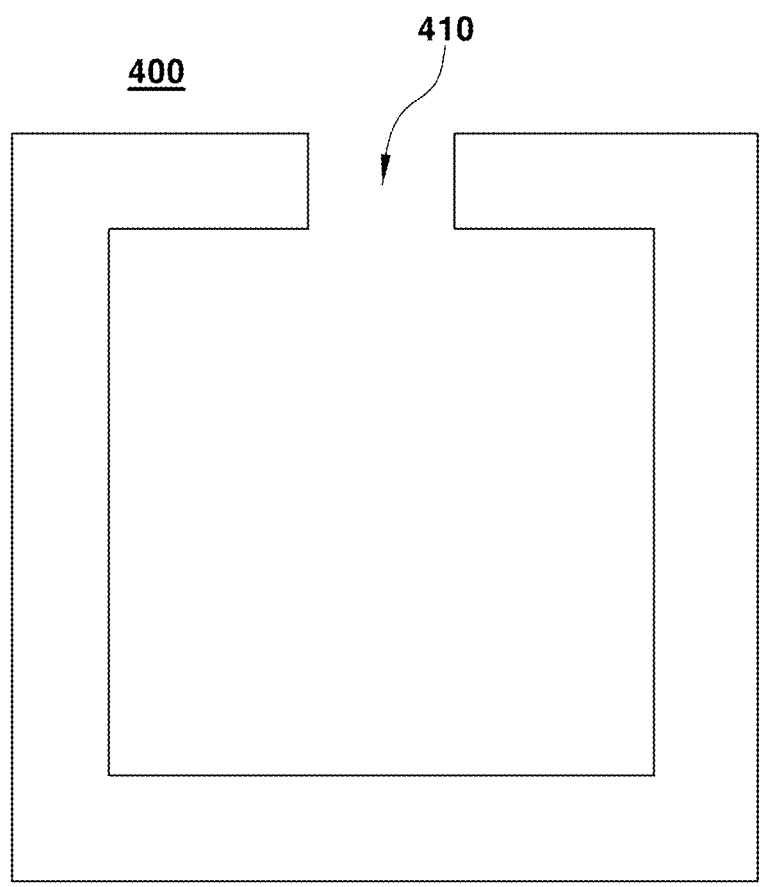
FIG. 5 is a plan view diagram illustrating one surface of a first gasket.

FIG. 5 is a plan view illustrating one surface of the first gasket 400. The first gasket 400 is a frame structure with a pass-through opening extending from one side to the other at the center. The first gasket 400 may have an opening 410 at an upper portion thereof. A new anode material 600 can be supplied to the gap between the support 500 and the separator 300 through the opening 410.

The first gasket 400 may be made of an unbreakable, chemically stable material. For example, the first gasket 400 may be made of a fluorine resin such as Teflon.

The first gasket 400 may have a thickness in a range of 1 mm to 20 mm, a range of 5 mm to 20 mm, or a range of 10 mm to 20 mm. When the thickness of the first gasket 400 is smaller than 1 mm, the gap is so short that the anode material 600 cannot be properly accommodated.

The metal-carbon dioxide battery 10 may further include a detachable stopper C to close the opening 410.

The size of the stopper C is not particularly limited if the opening 410 can be completely closed by the stopper C so that the internal space can be completely sealed. The stopper C may be made of a material that is not reactive with the electrolyte or the anode material 60.

The support 500 may be installed in the gap defined, between the first plate 100 and the separator 300, by the first gasket 400.

As illustrated in FIG. 3, the support 500 may be obliquely inclined so that the internal space in which the anode material 600 is to be accommodated is gradually reduced from the upper side to the lower side. When the anode material 600 is ionized to be reduced in size, the anode material 600 gradually piles at the lower side. Thus, the contact area between the anode material 600 and the support 500 increases, which facilitate the ionization of the anode material 600. On the other hand, when the support 500 is installed in the opposite direction, the distance between the anode material 600 and the cathode 700 increases and thus the resistance of the anode material 600 increases, which may result in the anode material 600 blocking the first electrolyte inlet portion 110 or obstructing the inflow of the electrolyte.

The support 500 may include a stainless-steel mesh.

Figure 6:
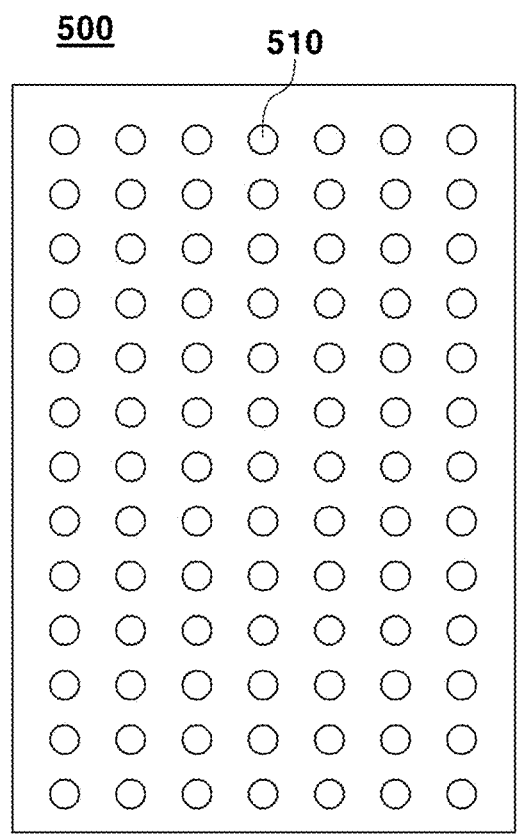
FIG. 6 is a plan view illustrating one surface of a support.

FIG. 6 is a plan view illustrating one surface of the support 500. The support 500 may have multiple through holes 510. The electrolyte may move through the through holes 510.

Since the support 500 has a function of preventing the anode material 600 from escaping the internal space, the diameter of the through hole 510 needs to be smaller than the diameter of the anode material 600. Specifically, the diameter of the through holes 510 may be in a range of from 0.5 mm to 2 mm.

The anode current collector 600 may include at least one material selected from the group comprising indium (In), copper (Cu), magnesium (Mg), aluminum (Al), stainless steel (SUS), iron (Fe), and combinations thereof.

The anode material 600 may be provided in the form of spherical, elliptical, or cylindrical pellets. When the anode material 600 is provided in the form of elliptical pellets, the diameter of the anode material 600 may correspond to the length of the long axis. When the anode material 600 is provided in the form of cylindrical pellets, the diameter of the anode material 600 may correspond to the diameter of the base of the cylinder shape. Specifically, the diameter of the anode material 600 may be in the range of from 3 mm to 10 mm. When the diameter of the anode material 600 is smaller than 3 mm, there is a risk that the anode material 600 escapes through the through hole 510 because the size of the anode material 600 decreases due to the ionization. When the diameter of the anode material 600 exceeds 10 mm, the specific surface area of the anode material 600 is reduced, and thus the performance of the metal-carbon dioxide battery is reduced.

Figure 7:
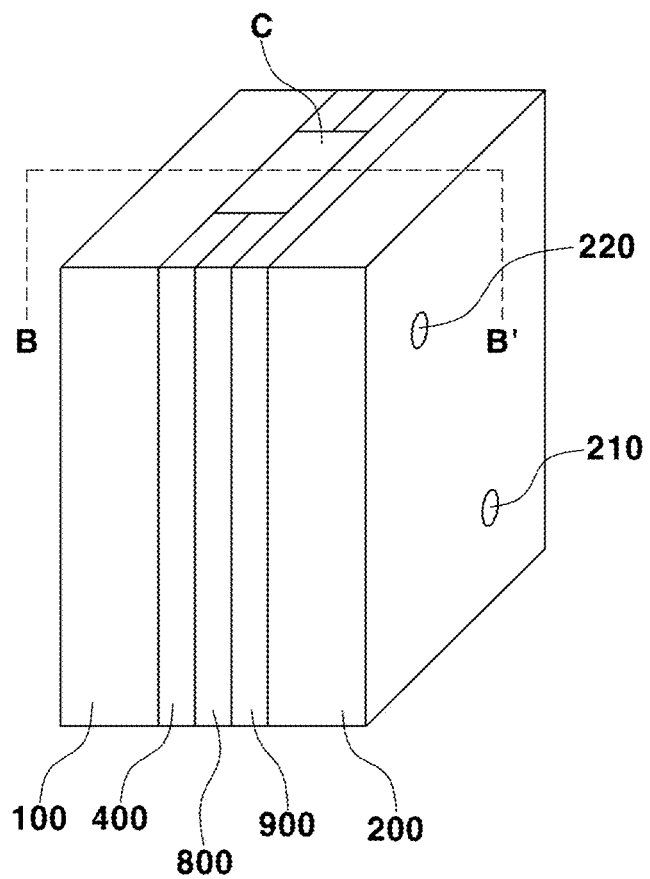
FIG. 7 is a perspective view of a metal-carbon dioxide battery according to a second embodiment of the present disclosure.
Figure 8:
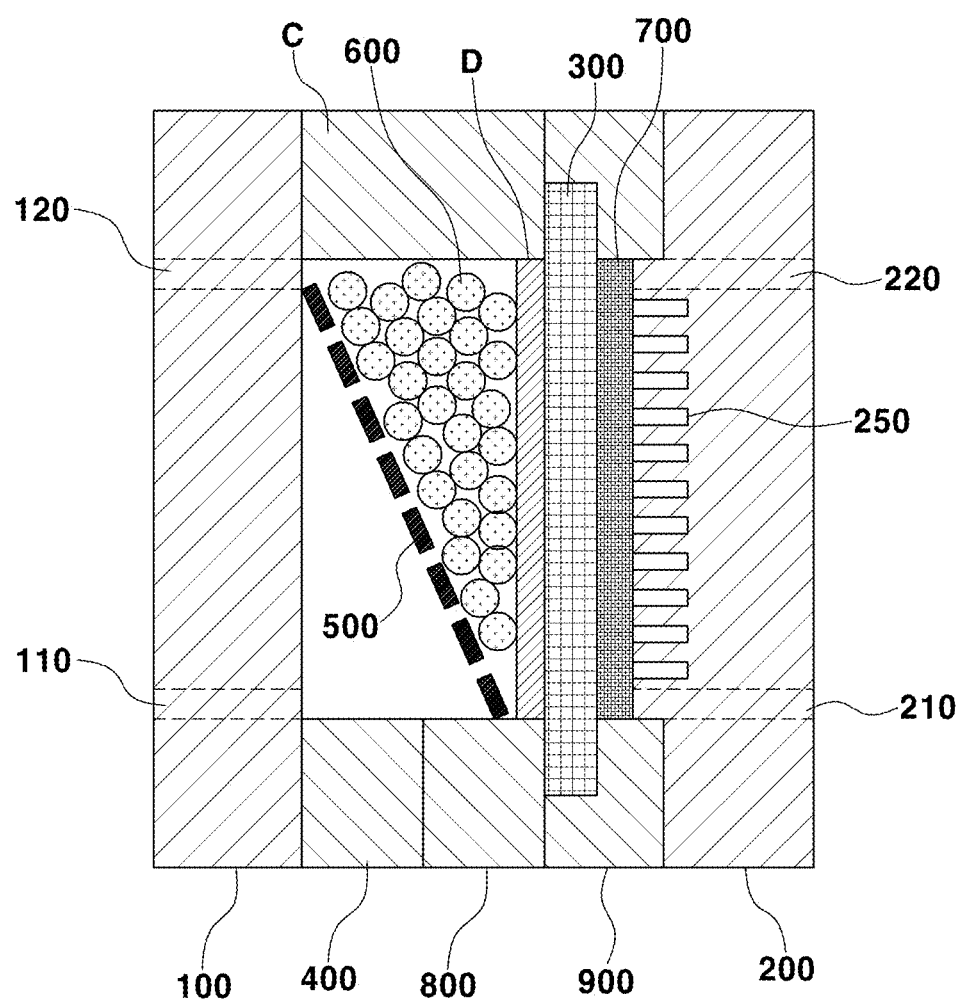
FIG. 8 is a cross-sectional view taken along line B-B' of FIG. 7.

FIG. 7 is a perspective view of a metal-carbon dioxide battery 10 according to a second embodiment of the present disclosure. FIG. 8 is a cross-sectional view taken along line B-B' of FIG. 7. Referring to FIG. 8, the metal-to-carbon dioxide battery 10 further includes a spacer 800 disposed between the first gasket 400 and the separator 300 and having a predetermined thickness. Therefore, the gap between the first plate 100 and the separator 300 is increased by a size corresponding to the thickness of the spacer 800.

Figure 9:
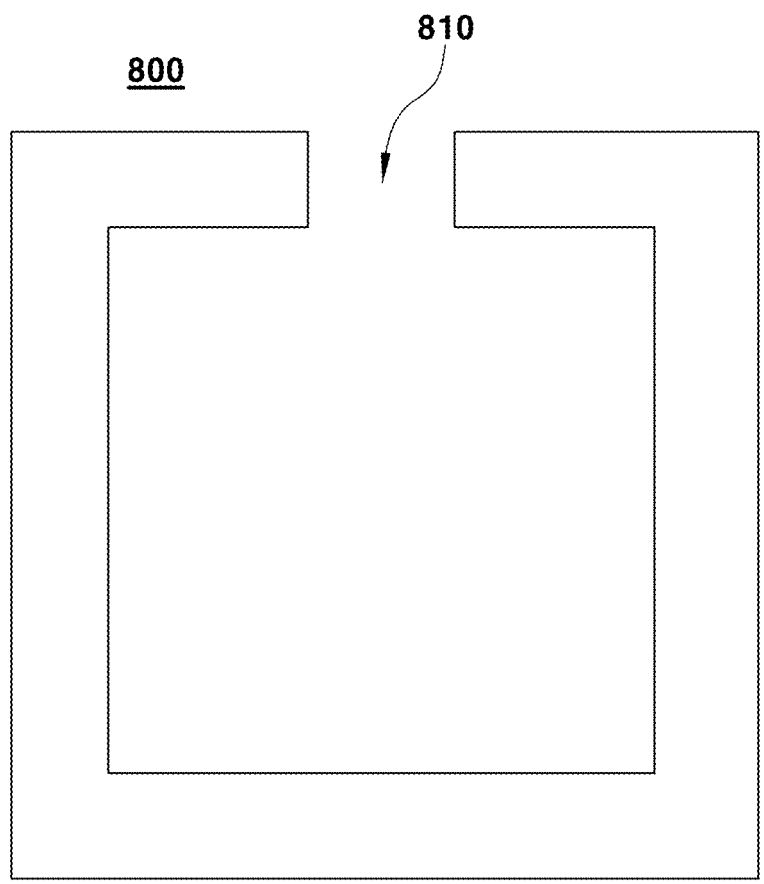
FIG. 9 is a plan view illustrating one surface of a spacer.

FIG. 9 is a plan view illustrating one surface of the spacer 800. Referring to FIG. 9, the spacer 800 is a frame structure with a pass-through opening extending from one side to the other at the center thereof. The first gasket 400 has an opening 810 in an upper portion thereof.

The cut portion 810 communicates with the opening 410 so that the cut portion 810 and the opening 410 collaborate to function as a passage through which the anode material 610 is introduced.

The spacer 800 may have a thickness in a range of 1 mm to 20 mm, a range of 5 mm to 20 mm, or a range of 10 mm to 20 mm. When the thickness of the spacer 800 is smaller than 1 mm, the gap increasing effect is insignificant.

The spacer 800 may be made of a material having chemical resistance. For example, the spacer 800 may be made of rubber, resin, silicone, metal, or the like.

The metal-carbon dioxide battery 10 may further include a detachable stopper C installed to close the opening 410 and the cut portion 810.

The size of the stopper C is not particularly limited if the opening 410 and the cut portion can be completely blocked by the stopper C so that the internal space can be completely sealed. The stopper C may be made of a material that is not reactive with the electrolyte or the anode material 60.

The metal-carbon dioxide battery 10 may further include a protective film D disposed between the anode material 60 and the separator 300. The protective film D may be installed in direct contact with the separator 300.

The protective film D is a component to prevent the anode material 60 from contacting the separator 300, thereby protecting the separator 300 from an impact applied thereto.

The protective film D may have a size by which it is possible to cover the entire area of the separator film 300 that may contact the anode material 60.

The protective film D may be made of a material having strong chemical resistance. For example, the protective film D may be made of rubber, resin, silicone, metal, or the like.

The protective film D may be a porous film. Therefore, the protective film D may be impregnated with an electrolyte so that cations ($K^+$) in the electrolyte may pass through the separator 300 to reach the cathode 700.

The separator 300 is a porous structure that allows cations moving between the anode material 600 and the cathode 700 to pass therethrough but blocks the movement of electrolytes therethrough.

The separator 300 may include a cation conductive resin. For example, the separator 300 may include a perfluoric sulfonic acid-based resin such as Nafion.

The separator 300 may have a thickness of 25 to 250 μm.

The cathode is an electrode which may include at least one material selected from the group comprising carbon paper, carbon fiber, carbon felt, carbon cloth, metal foam, thin metal film, and combinations thereof, or may include a catalyst. The cathode may include a noble metal catalyst, such as platinum, on a support.

Figure 10:
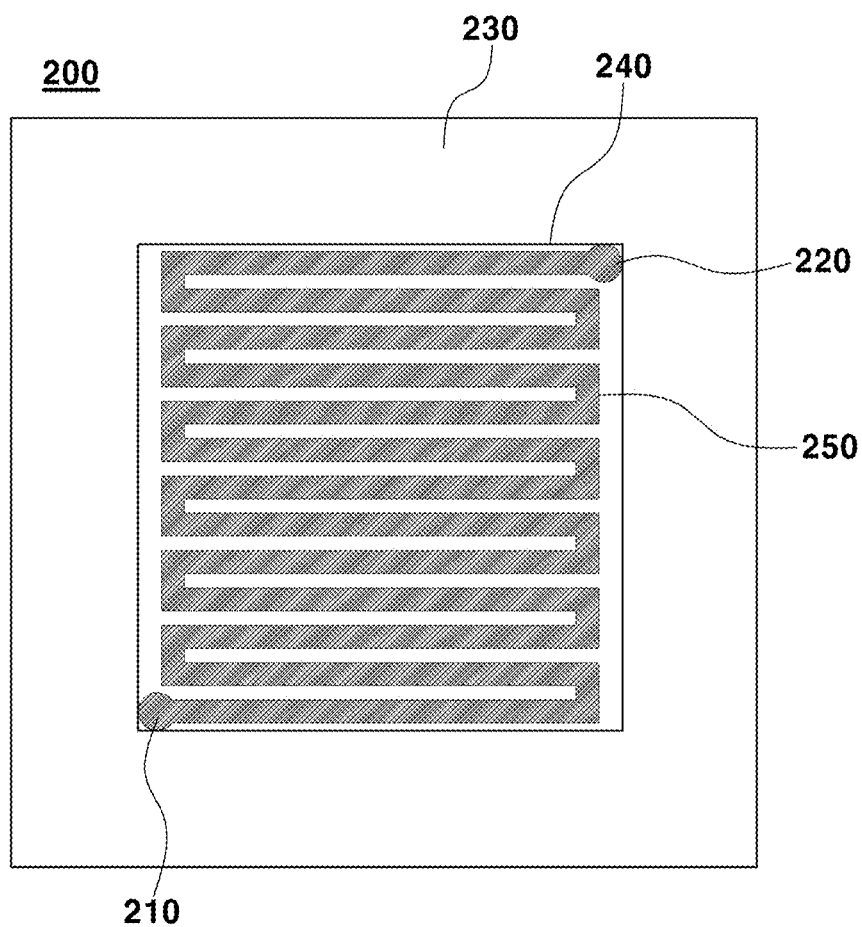
FIG. 10 is a plan view illustrating one surface of a second plate.

FIG. 10 is a plan view illustrating one surface of the second plate 200. The second plate 200 includes a plate-like body part 230 and a protrusion part 240 protruding from a center portion of a surface of the body part 230 and having a predetermined width. The second plate 200 may also include a second electrolyte inlet 210 formed to extend through the protrusion part 240 and the body part 230 and a second electrolyte outlet 220 formed to extend through the protrusion part 240 and the body part 230 and spaced from the second electrolyte inlet 210. The second plate 200 may further include a flow channel 250 having a first end communicating with the second electrolyte inlet 210 and a second end communicating with the second electrolyte outlet 220.

The second plate 200 may serve as a current collector and thus may be made of a conductive material. Therefore, the second plate 200 receives electrons from the first plate 100 and transfers the electrons to the cathode 700 through a conducting portion (not illustrated). In other words, the metal-carbon dioxide battery according to the present disclosure has a structure in which electrons can move without using additional tabs or the like.

The second electrolyte inlet 210 may be formed to pass through the second plate and may be positioned near an edge of the protrusion part 240. The second electrolyte outlet 220 may be formed to pass through the second plate at a position symmetrical with the second electrolyte inlet 210 with respect to a center point of the protrusion part 240.

The cathode 700 may be in direct contact with the protrusion part 240.

A second electrolyte introduced through the second electrolyte inlet 210 flows through the flow channel 250 to the second electrolyte outlet 220. In this process, the second electrolyte is supplied to the cathode 700. A metal mesh or foam may be provided between the cathode 700 and the protrusion part 240 for diffusion of the second electrolyte.

The flow channel 250 is recessed to a predetermined depth from the surface of the protrusion part 240. The shape of the flow channel 250 is not particularly limited. As illustrated in FIG. 10, the flow channel 250 may have a zigzag shape.

The second gasket 900 is intended to prevent short circuits in the battery. The second gasket 900 is a frame structure with a pass-through opening extending from one side to the other at the center. The second gasket 900 may be put on the circumferential surface of the protrusion part 240. The second gasket 900 has a shape capable of surrounding the entire side surfaces of the separator 300 and the cathode 700 such that the separator 300 and the cathode 700 are not exposed.

The second gasket 900 may be made of an unbreakable, chemically stable material. For example, the second gasket 900 may be made of a fluorine resin such as Teflon.

Hereinafter, the operation of the hydrogen generation and carbon dioxide storage system are described in detail.

The first electrolyte supply unit 20 supplies a first electrolyte to the metal-carbon dioxide battery 10 via the first electrolyte inlet 110.

The first electrolyte includes an alkaline aqueous solution or seawater. The first electrolyte may include a 6M potassium hydroxide (KOH) solution.

The first electrolyte flows into the gap between the first plate 100 and the separator 300 through the first electrolyte inlet 110.

When the anode material 600 contacts the first electrolyte, the anode material 600 is ionized and electrons are produced. The electrons travel through the support 500 to the first plate 100. The electrons travel from the first plate 100 to the second plate 200 via a conductor (not shown) and enter the cathode 700.

Cations ($K^+$) ions, which are generated during the ionization of the anode material 600, pass through the separator 300 and reach the cathode 700.

The second electrolyte supply unit 30 supplies a second electrolyte to the metal-carbon dioxide battery 10 via the second electrolyte inlet 210. The system may further include a carbon dioxide supply device that supplies carbon dioxide to the second electrolyte supply unit 30.

The second electrolyte includes an alkaline aqueous solution or seawater. The second electrolyte may include a 3M potassium bicarbonate ($KHCO_3$) solution.

The second electrolyte and carbon dioxide are supplied to the cathode 700 through the second electrolyte inlet 210. In the cathode 700, a chemical elution reaction of carbon dioxide occurs as described below.

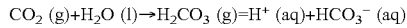

$$CO_2\,(g) + H_2O\,(l) \rightarrow H_2CO_3\,(g) = H^+\,(aq) + HCO_3^-\,(aq)$$

Next, the cathode 700 undergoes a hydrogen generation reaction as described below.

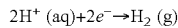

$$2H^+\,(aq) + 2e^- \rightarrow H_2\,(g)$$

In the cathode 700, carbon dioxide is stored in a salt form as described below.

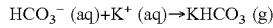

$$HCO_3^-\,(aq) + K^+\,(aq) \rightarrow KHCO_3\,(g)$$

$H_2$ and $KHCO_3$ are discharged to the outside of the battery through the second electrolyte outlet 220 along with the second electrolyte.

The separation unit 40 receives $H_2$ and $KHCO_3$ discharged from the battery and separates hydrogen. To this end, the separation unit 40 may include a gas-liquid separator. The separation unit 40 may include a filter to collect $KHCO_3$ from the liquid component.

The separation unit 40 supplies the second electrolyte back to the second electrolyte supply unit 30. The second electrolyte supply unit 30 includes a filtration member such as a filter for collecting the remaining $KHCO_3$ from the second electrolyte supplied from the separation unit 40.

Other forms of the disclosure are described in more detail with reference to examples described below. The examples described below are presented only to help understanding of the present disclosure, and the scope of the present disclosure is not limited thereto.

Comparative Example

A metal-carbon dioxide battery disclosed in Korean Patent Application No. 10-2021-0136204 was prepared. The anode was zinc and the cathode was a platinum catalyst (Pt/C) with a carbon support. The first electrolyte was 6M KOH and the second electrolyte was 3M $KHCO_3$. The spacer that was used had a thickness of about 5 mm.

Figure 11:
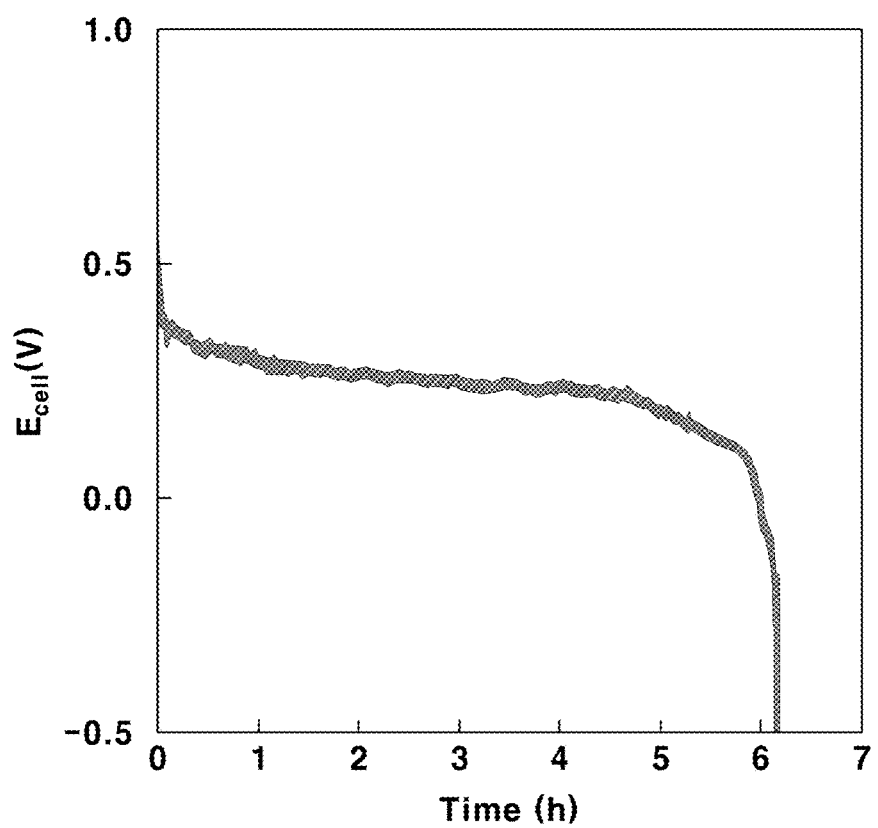
FIG. 11 is a discharge graph of a metal-carbon dioxide battery according to a comparative example.

FIG. 11 is a discharge graph of the metal-carbon dioxide battery according to the comparative example. The discharge performance of the battery was measured at a discharge current density of 50 milliampere per square centimeter ($mA/cm^2$). Referring to FIG. 1, the battery according to the comparative example needs to be dismantled and then supplied with a new anode material after about six hours of the discharging.

Example

A metal-carbon dioxide battery having a structure illustrated in FIGS. 7 and 8 was prepared. The anode material was zinc pellets and the cathode material was a platinum catalyst (Pt/C) with a carbon support. The first electrolyte was 6M KOH and the second electrolyte was 3M $KHCO_3$. The spacer that was used had a thickness of about 5 mm.

Figure 12:
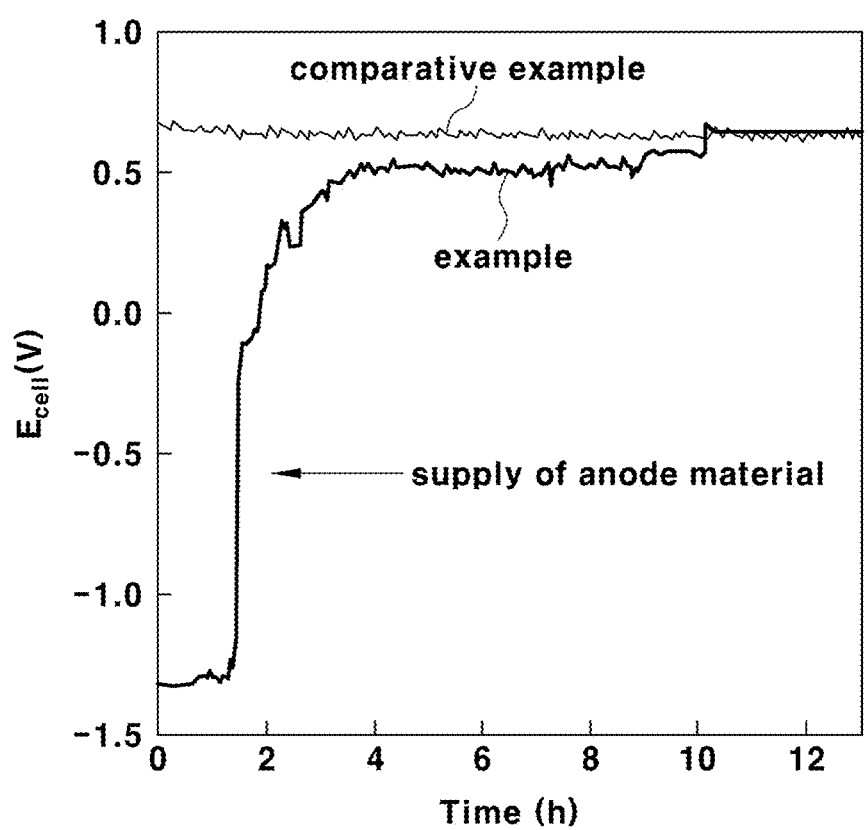
FIG. 12 illustrates discharge graphs of metal-carbon dioxide batteries according to an example and a comparative example.

FIG. 12 illustrates discharge graphs of metal-carbon dioxide batteries according to the example and the comparative example. The discharge performance of each of the batteries was measured at a discharge current density of 10 $mA/cm^2$. Referring to FIG. 12, the batteries of the example and the comparative example exhibit similar cell potentials at the same current density.

Figure 13:
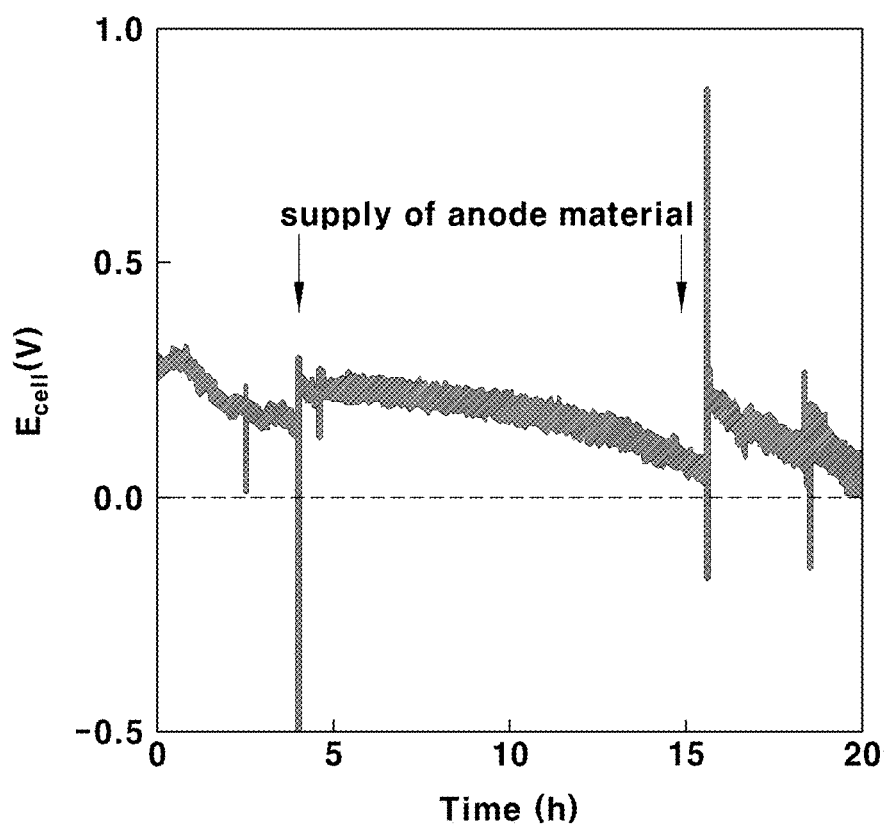
FIG. 13 is a discharge graph obtained when an anode material is continuously supplied to a metal-carbon dioxide battery according to an example.

FIG. 13 is a discharge graph obtained when an anode material is continuously supplied to the metal-carbon dioxide battery according to the example. The discharge performance of each of the batteries was measured at a discharge current density of 50 $mA/cm^2$. Referring to FIG. 13, it has been confirmed that the battery of the example can run for about 20 hours without having to be dismantled. It can be seen that the battery of the example can operate for a much longer period of time than the battery of the comparative example without dismantling the battery as long as the anode material is continuously supplied.

Although examples and experimental examples according to the present disclosure have been described for illustrative purposes, those of ordinary skill in the art should appreciate that various modifications, additions and substitutions are possible, without departing from the scope and spirit of the disclosure as defined in the appended claims.

What is claimed is:

1. A metal-carbon dioxide battery comprising:
   a first plate including a first electrolyte inlet formed to pass through the first plate at a predetermined position and a first electrolyte outlet formed to pass through the first plate and spaced apart from the first electrolyte inlet;
   a second plate including a second electrolyte inlet formed to pass through the second plate at a predetermined position and a second electrolyte outlet formed to pass through the second plate and spaced apart from the second electrolyte inlet;
   a separator interposed between the first plate and the second plate;
   a first gasket interposed between the first plate and the separator and has a shape of a frame, wherein the first gasket supports an edge portion of the first plate to define a gap between the first plate and the separator;

an anode material accommodated in the gap and having a shape of a pellet; and a cathode interposed between the second plate and the separator.

2. The metal-carbon dioxide battery of claim 1, wherein the first gasket comprises an opening at an upper portion thereof so that the anode material is supplied through the opening, and the metal-carbon dioxide battery further comprises a stopper detachably installed in the opening.

3. The metal-carbon dioxide battery of claim 1, wherein the metal-carbon dioxide battery further comprises a support having a shape of a plate and obliquely extending in an up-and-down direction, and the support comprises a plurality of through holes.

4. The metal-carbon dioxide battery of claim 3, wherein the anode material is accommodated in the space between the support and the separator.

5. The metal-carbon dioxide battery of claim 4, wherein the support is obliquely installed such that the space in which the anode material is accommodated becomes narrower toward a lower end of the metal-carbon dioxide battery.

6. The metal-carbon dioxide battery of claim 3, wherein the support comprises a stainless steel mesh.

7. The metal-carbon dioxide battery of claim 3, wherein the through hole has a smaller diameter than the anode material.

8. The metal-carbon dioxide battery of claim 3, wherein the through hole has a diameter in a range of about 0.5 to 2 mm.

9. The metal-carbon dioxide battery of claim 1, wherein the anode material comprises at least one of indium (In), copper (Cu), magnesium (Mg), aluminum (Al), stainless steel (SUS), iron (Fe) or any combination thereof.

10. The metal-carbon dioxide battery of claim 1, wherein the anode material has a diameter in a range of about 3 mm to 10 mm.

11. The metal-carbon dioxide battery of claim 1, wherein the metal-carbon dioxide battery further comprises a spacer having a shape of a frame and having a predetermined thickness, the spacer is interposed between the first gasket and the separator, and the gap between the first plate and the separator is increased by a size corresponding to the thickness of the spacer.

12. The metal-carbon dioxide battery of claim 11, wherein the first gasket comprises an opening at an upper portion thereof to accommodate the anode material, the spacer comprises a cut portion communicating with the opening, in a portion of an upper portion thereof, and the metal-carbon dioxide battery further comprises a stopper detachably installed in the opening and the cut portion.

13. The metal-carbon dioxide battery of claim 1, wherein the metal-carbon dioxide battery further comprises a protective film having a shape of a plate and interposed between the anode material and the separator, and wherein the protective film is porous.

14. The metal-carbon dioxide battery of claim 1, wherein the cathode comprises at least one of carbon paper, carbon fiber, carbon felt, carbon cloth, metal foam, thin metal film or any combination thereof.

15. The metal-carbon dioxide battery of claim 1, wherein the cathode comprises a catalyst in which a noble metal is supported on a support.

16. The metal-carbon dioxide battery of claim 1, wherein
the second plate comprises a body part having a shape of a plate and a protrusion part protruding from a center portion of a surface of the body part, wherein an area of the protrusion part is equal to or smaller than an area of the cathode, the second electrolyte inlet is formed to extend through the protrusion part and the body part, the second electrolyte outlet is formed to extend through the protrusion part and the body part, and the second plate further comprises a flow channel recessed from a surface of the protrusion part, the flow channel having a first end communicating with the electrolyte inlet and a second end communicating with the electrolyte outlet.

17. The metal-carbon dioxide battery of claim 16, wherein the cathode is in direct contact with the protrusion part.

18. The metal-carbon dioxide battery of claim 16, wherein the metal-carbon dioxide battery further comprises a second gasket provided on an outer circumferential surface of the protrusion part.

19. A hydrogen generation and carbon dioxide storage system comprising:

the metal-carbon dioxide battery of claim 1, wherein metal-carbon dioxide battery uses carbon dioxide as a fuel and generates hydrogen;

a first electrolyte supply unit connected to the first electrolyte inlet of the metal-carbon dioxide battery and supplying a first electrolyte to the metal-carbon dioxide battery;

a second electrolyte supply unit connected to the second electrolyte inlet of the metal-carbon dioxide battery and supplying a second electrolyte and carbon dioxide to the metal-carbon dioxide battery; and a separation unit connected to the second electrolyte outlet of the metal-carbon dioxide battery to receive a product of the metal-carbon dioxide battery, to separate hydrogen gas from the product, and to recover carbon dioxide stored in a salt form.

20. The system of claim 19, wherein the first electrolyte comprises an alkaline aqueous solution or seawater, and wherein the second electrolyte comprises an alkaline aqueous solution or seawater.

\* \* \* \* \*